United States Patent
Zhang et al.

(10) Patent No.: US 12,290,028 B1
(45) Date of Patent: May 6, 2025

(54) **METHOD FOR RAPID RECONSTRUCTION OF FOOD SOURCE HABITAT OF *LEUCOGERANUS LEUCOGERANUS* BY USING RETURNED FARMLAND**

(71) Applicant: Northeast Institute of Geography and Agroecology, Chinese Academy of Sciences, Changchun (CN)

(72) Inventors: Mingye Zhang, Changchun (CN); Shouzheng Tong, Changchun (CN); Ming Jiang, Changchun (CN); Guodong Wang, Changchun (CN); Yu An, Changchun (CN); Geng Cui, Changchun (CN)

(73) Assignee: Northeast Institute of Geography and Agroecology, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/977,209

(22) Filed: Dec. 11, 2024

(30) Foreign Application Priority Data

Dec. 22, 2023 (CN) .......................... 202311773584.1

(51) Int. Cl.
*A01G 22/35* (2018.01)
*A01B 79/02* (2006.01)
*A01G 25/00* (2006.01)
*G05B 15/02* (2006.01)

(52) U.S. Cl.
CPC .............. *A01G 22/35* (2018.02); *A01B 79/02* (2013.01); *G05B 15/02* (2013.01); *A01G 25/00* (2013.01)

(58) Field of Classification Search
USPC ..... 47/48.5, 1.01 R, 1.01 F, 58.1 R, 58.1 SC, 47/FOR. 100, DIG. 10, DIG. 9
See application file for complete search history.

(56) References Cited

U.S. PATENT DOCUMENTS 5,337,516 A    8/1994    Hondulas

FOREIGN PATENT DOCUMENTS

| CN | 103314763 | A | 9/2013 | |
|---|---|---|---|---|
| CN | 104025822 | A | 9/2014 | |
| CN | 105684588 | A | 6/2016 | |
| CN | 105794470 | A | 7/2016 | |
| CN | 105948270 | A | 9/2016 | |
| CN | 106258384 | * | 1/2017 | ............. A01G 22/00 |
| CN | 106258384 | A | 1/2017 | |

(Continued)

OTHER PUBLICATIONS

Liu Zhengmao, et al., Theory and Methodology for Reverting Farmland to Wetland in Sanjiang Plain, Nature Ecological Conservation, Jan. 25, 2004, pp. 33-35, 53, No. 1, DOI:10.14026/j.cnki.0253-9705.2004.01.008 Claims involved: 1-10.

(Continued)

*Primary Examiner* — Andrea M Valenti
(74) *Attorney, Agent, or Firm* — Piloff Passino & Cosenza LLP; Rachel Piloff; Sean Passino (57) ABSTRACT

A method for rapid reconstruction of a food source habitat of *Leucogeranus leucogeranus* by using a returned farmland is provided, including following steps: S1, selecting degraded farmland plots; S2, constructing a connected plot network; S3, improving local soil habitat elements; S4, coating water chestnut bulbs; S5, cultivating the water chestnut bulbs; and S6, regulating and controlling and managing a hydrological environment.

6 Claims, 3 Drawing Sheets

(56) References Cited

FOREIGN PATENT DOCUMENTS

| | | | | |
|---|---|---|---|---|
| CN | 106688524 A | * | 5/2017 | ............. A01G 22/00 |
| CN | 108901663 A | | 11/2018 | |
| CN | 109042182 A | | 12/2018 | |
| CN | 110169234 A | | 8/2019 | |
| CN | 110915587 A | | 3/2020 | |
| CN | 116965190 A | | 10/2023 | |

OTHER PUBLICATIONS

Notification to Grant Patent Right for Invention dated Mar. 7, 2024 in SIPO application No. 202311773584.1.
Retrieval report—First search dated Jan. 29, 2024 in SIPO application No. 202311773584.1.
Retrieval report—First search dated Feb. 19, 2024 in SIPO application No. 202311773584.1.
Notice of first Office action dated Jan. 30, 2024 in SIPO application No. 202311773584.1.
Notice of Second Office action dated Feb. 20, 2024 in SIPO application No. 202311773584.1.
Retrieval report—First search dated Mar. 1, 2024 in SIPO application No. 202311773584.1.

* cited by examiner

METHOD FOR RAPID RECONSTRUCTION OF FOOD SOURCE HABITAT OF *LEUCOGERANUS LEUCOGERANUS* BY USING RETURNED FARMLAND

CROSS-REFERENCE TO RELATED APPLICATIONS

This application claims priority to Chinese Patent Application No. 202311773584.1, filed on Dec. 22, 2023, the contents of which are hereby incorporated by reference.

TECHNICAL FIELD

The present disclosure belongs to the technical field of wetland ecological engineering, and in particular relates to a method for rapid reconstruction of a food source habitat of *Leucogeranus leucogeranus* by using a returned farmland.

BACKGROUND

*Leucogeranus leucogeranus*, a large wading bird, belongs to the genus *Leucogeranus* of Gruiformes and Gruidac. The *Leucogeranus leucogeranus* population has lived on the earth for more than 60 million years and is known as the "activated stone" of birds. Due to the comprehensive influence of global climate change, there are only more than 5,000 *Leucogeranus leucogeranus* in the world. The international union for conservation of nature (IUCN) red list evaluates *Leucogeranus leucogeranus* as extremely endangered species and a first-class protected wild animal in China. Affected by regional environmental changes and human activities, the degradation of habitat and the lack of food-borne plants have profoundly affected the leisure quality and migration safety of *Leucogeranus leucogeranus* population. The rapid reconstruction of the food-borne habitat of *Leucogeranus leucogeranus* has become a key scientific problem in the field of wetland science.

At present, the ways to realize the rapid reconstruction of the food source habitat of *Leucogeranus leucogeranus* by returning farmland mainly include the methods of open hydrological connectivity and guest soil migration and covering. The open hydrological connectivity method has strong operability and low engineering cost. However, after the restoration, the hydrological situation of the restored plot may not be controlled, which may not accurately meet the growth and development needs of food-borne plants of *Leucogeranus leucogeranus*, and is vulnerable to the risk of flood disaster stress. The method of guest soil migration and covering has clear technical principle and wide application scope, but there are ecological problems such as destroying the composition structure of native wetland vegetation and invasion of alien species in the implementation. Generally speaking, none of the above methods may effectively use the returned farmland to realize the rapid reconstruction of the food source habitat of *Leucogeranus leucogeranus*. Therefore, how to integrate hydrological regulation and cultivation of food-source plants and other technical means while maintaining the integrity of the original wetland ecological structure, and utilize returned farmland to realize the rapid reconstruction of the food source habitat of *Leucogeranus leucogeranus*, has become a key problem to be solved in the field of wetland biodiversity conservation.

SUMMARY

In order to solve the problem that the local returned farmland may not be effectively used to rapidly reconstruct the food source habitat of *Leucogeranus leucogeranus* at present, the present disclosure provides a method for rapid reconstruction of a food source habitat of *Leucogeranus leucogeranus* by using a returned farmland, including following steps:

S1, selecting degraded farmland plots: selecting plots for returning farmland to wetland adjacent to a natural wetland as a target reconstruction site, and dividing stress degrees according to soil saline-alkali states of the plots for returning farmland to wetland;

S2, constructing a connected plot network: dividing independent reconstruction plot units in the reconstruction site, and piling soil ridges around the independent reconstruction plot units and on peripheral edges of the reconstruction site;

S3, improving local soil habitat elements: using surrounding natural wetland water bodies for flood irrigation of the target reconstruction site; using a rotary tiller for rotary tillage of surface soil, and performing secondary rotary tillage after adding vermiculite;

S4, coating water chestnut bulbs: collecting the water chestnut bulbs in the natural wetland at a designated time one year before implementing the food source habitat of *Leucogeranus leucogeranus*, and sequentially performing drying, low-temperature sand storage and a coating operation on the water chestnut bulbs;

S5, cultivating the water chestnut bulbs: cultivating the water chestnut bulbs in a form of rows in a unit reconstruction plot; and S6, regulating and controlling and managing a hydrological environment: using a water pump to divert water to regulate and control the hydrological environment of the target reconstruction site.

In an embodiment, dividing the stress degrees according to the soil saline-alkali states of the plots for returning farmland to wetland, specifically is: when a soil saline-alkali state is 0 millimole per liter (mmol/L), dividing into no saline-alkali stress, when a soil saline-alkali state is 0-25 mmol/L, dividing into mild saline-alkali stress, when a soil saline-alkali state is 25-50 mmol/L, dividing into moderate saline-alkali stress, and when a soil saline-alkali state is 50-100 mmol/L, dividing into severe saline-alkali stress.

In an embodiment, the soil ridges are piled by using the surface soil in reconstruction plots around the independent reconstruction plot units, a piling height of the soil ridges is 10-20 centimeters, and a piling width is 20-30 centimeters, and a middle part of each of the soil ridges is reserved with an open gap of 40-50 centimeters; when the soil ridges are piled on the peripheral edges of the reconstruction site, fully enclosed soil ridges are piled, with a piling height of the soil ridges of 30 to 40 centimeters and a piling width of 50 to 60 centimeters.

In an embodiment, the flood irrigation of the target reconstruction site specifically is:

performing flood irrigation until a surface accumulated water depth of the reconstruction site reaches 5-10 centimeters, with a water body retention duration lasting for 2-3 days, and then using the water pump to pump a water body and return to the natural wetland, requiring flood irrigation once for plots without saline-alkali type stress, flood irrigation twice for plots with mild saline-alkali stress, flood irrigation three times for plots with moderate saline-alkali stress and flood irrigation three to four times for plots with severe saline-alkali stress.

In an embodiment, when using the rotary tiller for the rotary tillage of the surface soil, a rotary tillage depth of the rotary tiller is 10 to 15 centimeters.

In an embodiment, before performing the secondary rotary tillage after adding the vermiculite, the vermiculite is placed in a 160° C. environment for heating for 2 to 3 hours.

In an embodiment, during the low-temperature sand storage, stored sandy soil materials are disinfected at a high temperature of 160° C. for 2 to 3 hours and cooled to room temperature, then added with distilled water until a sandy soil water content reaches 10-15%, and then uniformly mixed with the water chestnut bulbs and placed in a dark environment at 4° C. for continuous refrigeration, and sandy soil moisture is required to be replenished in the dark environment every 14 days during a refrigeration period.

In an embodiment, in the coating operation, firstly, the water chestnut bulbs after the low-temperature sand storage are placed in 1% potassium permanganate solution for disinfection after being washed, and then placed in a coating machine and coated in a roller form, where the coating machine is required to be internally provided with mixed powder of ammonium nitrate, urea, difenoconazole and brassinolide.

In an embodiment, when cultivating the water chestnut bulbs in the form of rows in the unit reconstruction plot, the water chestnut bulbs are required to be vertically inserted into a soil layer for 2-4 centimeters with top ends facing upwards by a hole sowing method, and top end parts are covered with in-situ soil; cultivation rows are required to be set parallel to a height direction of midday sun in a reconstruction area; 2 to 3 water chestnut bulbs are required to be cultivated in a single hole, with a preset hole spacing of 30 to 40 centimeters and a preset row spacing of 54.74-136.85 centimeters; and during a cultivation period, no accumulated water on the surface of the unit reconstruction plot and the soil water content maintained between 80 and 100% are required.

In an embodiment, when using the water pump to divert the water to regulate and control the hydrological environment of the target reconstruction site, a first water replenishment work is required to be carried out within 7 to 10 days after water chestnut seedlings are cultivated, and water replenishment is required until a soil water content is more than 65% and there is no accumulated water on a surface; a subsequent water diversion work is required to be carried out when the water chestnut seedlings grow to 3 to 5 centimeters; a flooding depth is required to be maintained at 5 centimeters after water replenishment; and artificial water replenishment is required to be terminated in early November.

The method provided by the present disclosure has following beneficial effects.

The method according to the present disclosure has clear principle, easy implementation and low cost. After reconstruction, the food source habitat of *Leucogeranus leucogeranus* does not need frequent manual maintenance. After the reconstruction, the *Leucogeranus leucogeranus* food source may be provided in the same year and *Leucogeranus leucogeranus* may be attracted to cat and rest, so the method is suitable for popularization and application in the project of returning farmland to wetland and the restoration of *Leucogeranus leucogeranus* habitat.

The method provided by the present disclosure may effectively improve the reconstruction rate of the food source habitat of *Leucogeranus leucogeranus*. By planning the connected grid to reconstruct the food source habitat of *Leucogeranus leucogeranus*, the fine monitoring of the restoration site and the precise resource regulation may be realized. According to the hydrological rhythm conditions, the differential salt washing work is carried out according to the salinity before the cultivation of water chestnut bulbs. Moreover, during the development period of water chestnut bulbs, staged hydrological environment is provided for development and tillering of water chestnut bulbs, which may effectively provide the suitable environment for foodborne plants of *Leucogeranus leucogeranus* and improve the development rate.

The method according to the present disclosure may effectively improve the development quality of *Leucogeranus leucogeranus* food source. In the present disclosure, the water chestnut bulbs are subjected to overwinter treatment by using a low-temperature sand storage process, so that gibberellin production in the water chestnut bulbs may be effectively catalyzed, thereby improving the dormancy breaking level of the water chestnut bulbs. According to the present disclosure, the mixed powder of ammonium nitrate, urea, difenoconazole and brassinolide is adopted to coat the water chestnut bulbs, so that sufficient nutrient conditions may be provided for tillering and biomass accumulation of new water chestnut bulbs in the development process of water chestnut, and at the same time, the salt-alkali resistance is strengthened.

The method according to the present disclosure is safe and effective, and there is no risk of alien species invasion and abiotic stress damage. All the used water chestnut bulb materials belong to common species in swamp wetlands, and are all taken from the natural wetland environment around the restoration site, so there is no risk of invasion by alien species. At the same time, all the selected plots in the method keep a certain safe distance from the natural wetland, and the soil ridges are piled around the peripheral plots by using the surface soil in the plots, which may effectively ensure the stability of the structure of environmental elements in the restored plots, thus avoiding the ecological risks caused by flood disasters to the restored plots.

DETAILED DESCRIPTION OF THE EMBODIMENTS

In the following, the technical solutions in the embodiments of the present disclosure will be clearly and completely described with reference to the attached drawings. Apparently, the described embodiments are only a part of the embodiments of the present disclosure, but not all the embodiments. Based on the embodiments in the present disclosure, all other embodiments obtained by one of ordinary skill in the art without creative effort belong to the protection scope of the present disclosure.

Embodiment 1

Figure 3:
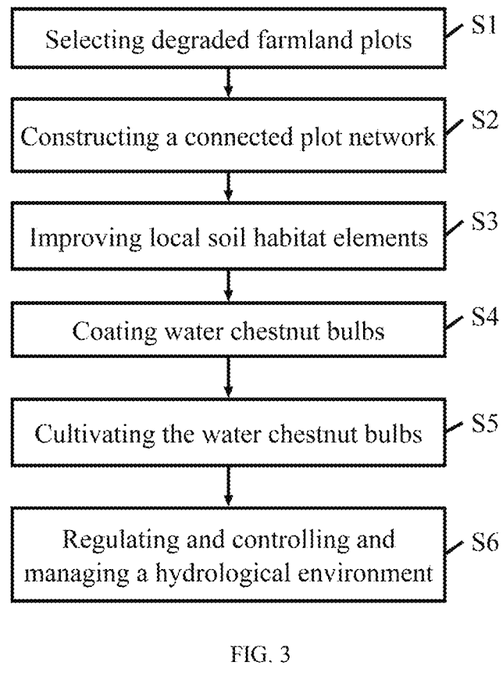
FIG. 3 is a flow chart of a method for rapid reconstruction of a food source habitat of *Leucogeranus leucogeranus* by using a returned farmland according to the present disclosure.

This embodiment provides a method for rapid reconstruction of a food source habitat of *Leucogeranus leucogeranus* by using a returned farmland, as shown in FIG. 3, specifically including the following steps:

I. Selection of Degraded Farmland Plots

From mid April to early May, the plots for returning farmland to wetland adjacent to the natural wetland were selected as a target reconstruction site, and the stress degrees were divided according to soil saline-alkali states of the plots for returning farmland to wetland. It was required that the linear distance between the target reconstruction plot and the natural wetland was between 20 meters and 50 meters, so that the surrounding water resources may be utilized in the reconstruction process, and at the same time, the same hydrological rhythm process may be maintained with the surrounding natural wetland after the reconstruction to achieve near-natural restoration. It was required to divide the saline-alkali stress degrees according to the content of sodium bicarbonate in the soil of reconstruction site, where 0 mmol/L was defined as no saline-alkali stress, 0-25 mmol/L as mild saline-alkali stress, 25-50 mmol/L as moderate saline-alkali stress and 50-100 mmol/L as severe saline-alkali stress.

II. Construction of Connected Plot Network

Every 400 square meters (20 meters (m)×20 m) was used as an independent reconstruction plot unit, and soil ridges were piled around the plots. It was required to use the surface soil in the reconstructed plots to pile the soil ridges, with piling height of the soil ridges of 10-20 centimeters, the piling width of 20-30 centimeters. The middle part of each of the soil ridges was reserved with an open gap of 40-50 centimeters, so as to ensure the convenience of daily maintenance in the later period and maintain the water circulation between soil ridges. It was required to pile fully enclosed soil ridges on the peripheral edges of the reconstruction site, with a piling height of the soil ridges of 30 to 40 centimeters and a piling width of 50 to 60 centimeters, so as to prevent the possible negative impact of unsuitable flood events in peripheral areas. It was required to peel off the surface soil in the adjacent plots to pile the soil ridges.

III. Improvement of Local Soil Habitat Elements

The surrounding natural wetland water bodies were used for flood irrigation of the target reconstruction site, so as to reduce the salt content of the soil in the reconstruction site by washing salt. A rotary tiller was used for rotary tillage of the surface soil, and then vermiculite was added for secondary rotary tillage. It was required to set up a water pump between the reconstruction site and the natural wetland to transport the water body until a surface accumulated water depth of the reconstruction site reached 5-10 centimeters, with a water body retention duration lasting for 2-3 days, and then use the water pump to pump the water body and return to the natural wetland. It was required that flood irrigation once for plots without saline-alkali type stress, flood irrigation twice for plots with mild saline-alkali stress, flood irrigation three times for plots with moderate saline-alkali stress and flood irrigation three to four times for plots with severe saline-alkali stress. A rotary tillage depth of 10 to 15 centimeters by the rotary tiller was required to improve the physical structure and air permeability of the surface soil. Vermiculite materials were required to be placed in a 160° C. environment for heating for 2 to 3 hours for improving the soil habitat of the reconstruction site, so as to avoid the negative impact of the borne pathogens on the growth activities of food-borne plants. It was required to add 40 to 50 kilograms of vermiculite into the reconstruction plot unit to ensure that the air permeability of the soil habitat may be continuously improved during the plant growth period.

IV. Water Chestnut Bulb Coating Treatment

Underground bulbs of Water chestnut were collected in natural wetland from early October to early November of the year before the implementation of food source habitat of *Leucogeranus leucogeranus*. Underground bulbs of *Eleocharis palustris*, *Eleocharis ovata*, *Eleocharis vallecu-losa* and *Eleocharis macrostachya* were required to be collected. The dried water chestnut bulbs were subjected to low-temperature sand storage until the early May of the year when the food source habitat of *Leucogeranus leucogeranus* was reconstructed. It was required to select bulbs with no traces of pests and diseases on the epidermis and a single mass of 20-30 gram (g) as planting water chestnut materials. The water chestnut materials were required to be stored in moist sandy soil environment at low temperature after being naturally air-dried in a dark and ventilated environment with a constant temperature of 20-22° C. The stored sandy soil materials were required to be disinfected at high temperature of 160° C. for 2 to 3 hours and cooled to room temperature, and then added with distilled water until the sandy soil water content reached 10-15%, and then fully mixed with the water chestnut materials, and then placed in a dark environment at 4° C. for continuous refrigeration. It was required to replenish sandy soil moisture in a dark environment every 14 days during a refrigeration period to maintain a humid environment.

The water chestnut bulbs after the low-temperature sand storage were washed repeatedly with sterile water for 3 to 5 times, then soaked in potassium permanganate solution for 10 to 20 minutes, washed repeatedly with sterile water for 3 to 5 times again, and then placed in a coating machine for coating operation. The concentration of potassium permanganate solution was required to be 1% in order to destroy the bacteria attached to the surface layer of seed coat and activate its physical structure by virtue of its strong oxidation characteristics. The coating machine was required to be internally provided with mixed powder of ammonium nitrate, urea, difenoconazole and brassinolide (mass ratio of 1.5:7:1:0.5) for coating. It was required to coat the water chestnut bulbs in the roller form, with the coating agent covering the surfaces of all the water chestnut bulbs as the coating definition standard.

V. Water Chestnut Bulb Cultivation

From mid May to mid June, water chestnut bulbs were cultivated in rows in the unit reconstruction plot. The water chestnut bulbs were required to be vertically inserted into a soil layer for 2-4 centimeters with top ends facing upwards by a hole sowing method, and top end parts were covered with in-situ soil. Cultivation rows were required to be set parallel to a height direction of midday sun in a reconstruction area to ensure the maximum natural light efficiency during the development of cultivated water chestnut and improve the photosynthetic efficiency. Two to three water chestnut bulbs were required to be cultivated in a single hole, with a preset hole spacing of 30 to 40 centimeters and a preset row spacing of 54.74-136.85 centimeters, so as to reserve the underground lateral development space of water chestnut bulbs and avoid the resource loss caused by inter-specific competition. During a cultivation period, no accumulated water on the surface of the unit reconstruction plot and the soil water content maintained between 80 and 100% were required.

The reason for the row spacing selection is that the *Leucogeranus leucogeranus* population partially stays in the northeast of China and south of the Yangtze River, and its latitude range is 32°34′–53°33′/N. The water chestnut growing season is mainly concentrated in summer in the northern hemisphere, that is, the direct point of the sun is in the range of 0°-23°26′/N. According to the midday sun height and the water chestnut growing height, the row spacing range is 54.74-136.85 cm.

VI. Regulation and Control and Management of Hydrological Environment

After the completion of water chestnut bulb cultivation, the water pump was used to divert water to regulate and control the hydrological environment of the target reconstruction site. It was required to carry out the first water supplement work within 7 to 10 days after cultivation of the water chestnut seedlings, and replenish water until the soil water content was more than 65% and there was no obvious water accumulation on the surface. The subsequent water diversion work was required to be carried out when the water chestnut seedlings grew to 3 to 5 centimeters, and the flooding depth was required to be maintained at 5 centimeters after water replenishment, so as to provide sufficient water conditions for the development of water chestnut bulbs and avoid oxidative damage to the development of water chestnut seedlings caused by anoxic environment. It was required to terminate artificial water replenishment in early November to provide suitable feeding habitat for *Leucogeranus leucogeranus* and avoid the noise of the water pump interfering with the feeding activities of the *Leucogeranus leucogeranus* population.

Embodiment 2

This embodiment was a further definition of Embodiment 1, and the effectiveness of the method described in Embodiment 1 was verified by specific reconstruction tests, specifically as follows.

I. Selection of Degraded Farmland Plots

On Apr. 29, 2023, several returned farmland plots (6,400 square meters in total) were selected from the periphery of Baihe Lake wetland in Momoge National Nature Reserve, Jilin Province as the target reconstruction wetlands. These plots were all adjacent to the edges of Baihe Lake wetland, with an average straight-line distance of 39 meters from the open water surface of Baihe Lake. The content of sodium bicarbonate in soil of each plot was 0 mmol/L, 21 mmol/L, 42 mmol/L and 84 mmol/L, respectively, which were divided into no saline-alkali stress, mild saline-alkali stress, moderate saline-alkali stress and severe saline-alkali stress.

II. Construction of Connected Plot Network 20 m×20 m (400 square meters) was taken as a single reconstruction plot unit, and soil ridges with a height of 15 centimeters, a width of 25 centimeters, and an open opening with a width of 45 centimeters reserved in the middle part were piled using in-situ soil on periphery for daily management and hydrological communication. Fully enclosed soil ridges with a height of 35 centimeters and a width of 55 centimeters were piled on the periphery of the reconstruction site, and a total of 50 independent reconstruction site units were built.

III. Improvement of Local Soil Habitat Elements

The water pump was used to draw water from Baihe Lake for flood irrigation of the target reconstruction site for three times until the surface accumulated water depth was 10 centimeters, and then it was maintained for seven days. After that, the water body was transported back to Baihe Lake to clean the surface salt of the soil. After using the rotary tiller for rotary tillage of the surface soil with a depth of 15 centimeters, 50 kilograms of vermiculite disinfected at 160° C. for 3 hours were evenly added to each plot for secondary rotary tillage, so as to improve the air permeability of soil habitat.

IV. Water Chestnut Bulb Coating Treatment

The underground water chestnut bulbs collected in Momoge wetland on Oct. 31, 2022 were subjected to low-temperature sand storage. The weight of each of the treated water chestnut bulbs was about 25 g, and the epidermis had no traces of pests and lesions. Before the low-temperature sand storage, all water chestnut bulbs were air-dried in a constant temperature environment of 22° C., away from light, to remove epidermal moisture. The used sandy soil materials were disinfected at a high temperature of 160° C., and then added with distilled water to 15% water content, and then uniformly mixed with the water chestnut bulbs and placed in a dark environment at 4° C. for continuous refrigeration until May 10, 2023, and sandy soil moisture was replenished in the dark environment every 14 days during the refrigeration period to maintain a humid environment.

The water chestnut bulbs after the low-temperature sand storage were washed with sterile water for 5 times, and then soaked in 1% potassium permanganate solution for 20 minutes, and then washed again with sterile water for 5 times for coating operation. The mixed powder of ammonium nitrate, urea, difenoconazole and brassinolide was used to coat the water chestnut bulbs in the roller form in the coating machine, with the coating agent covering the surfaces of all the water chestnut bulbs as the coating definition standard.

V. Water Chestnut Bulb Cultivation

On Jun. 2, 2023, cultivation rows of the water chestnut bulbs were set in the direction parallel to the midday sun direction. During the cultivation process, the water chestnut bulbs were vertically inserted into the soil layer for 3 centimeters with the top ends facing upwards with a specification of 3 water chestnuts per hole, and the in-situ soil was used to shallowly cover the top ends of water chestnuts. During the cultivation process, the spacing between each hole was 35 centimeters, the row spacing was 60 centimeters, and the soil water content was between 90 and 100%.

Figure 1:
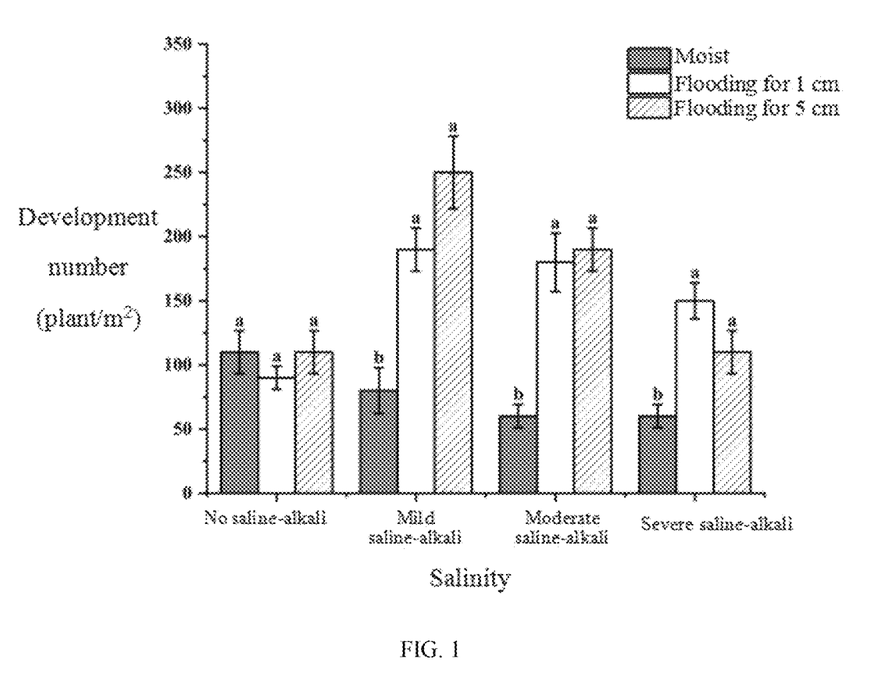
FIG. 1 is a result diagram of influence of hydrological conditions in returned farmland with different salinity on development number of water chestnut bulbs in embodiments of the present disclosure.
Figure 2:
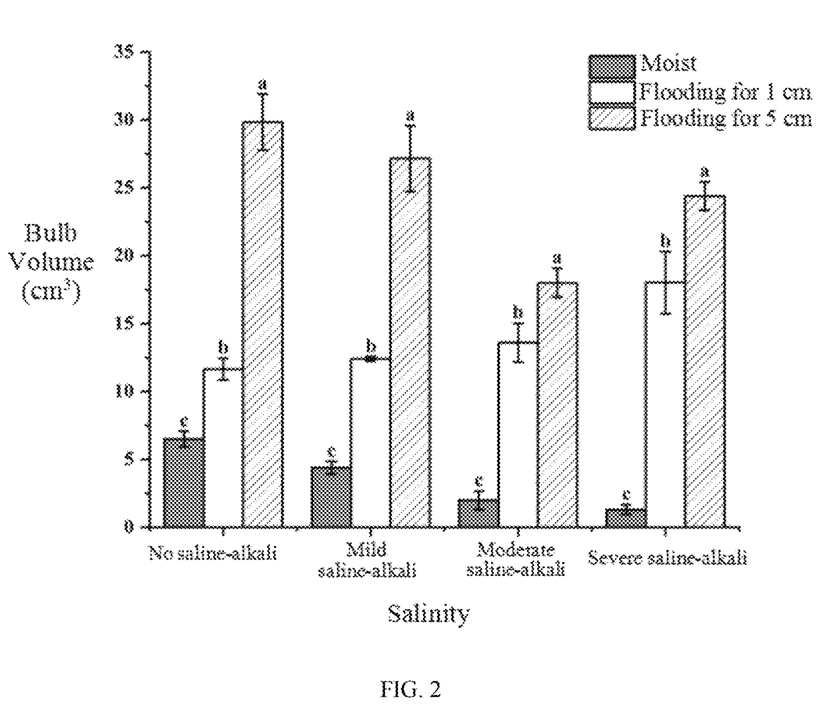
FIG. 2 is a result diagram of influence of hydrological conditions in returned farmland with different salinity on volume of water chestnut bulbs in embodiments of the present disclosure.

FIG. 1 shows a schematic diagram of the influence of hydrological conditions in returned farmland with different salinity on the development number of water chestnut bulbs, and FIG. 2 shows a schematic diagram of the influence of hydrological conditions in returned farmland with different salinity on the volume of water chestnut bulbs, where a, b and c are difference signs. For example, in FIG. 1, under no saline-alkali conditions, the difference signs are all a under moist conditions, flooding for 1 cm, and flooding for 5 cm, indicating that the difference is not significant. For example, in FIG. 2, under no saline-alkali conditions, the difference signs are a, b, and c for moist conditions, flooding for 1 cm, and flooding for 5 cm, respectively, indicating significant differences.

VI. Regulation and Control and Management of Hydrological Environment

On Jun. 10, 2023, the first water replenishment operation was carried out using the water pump for replenishing water until the soil water content in the plot was greater than 65% and there was no obvious water accumulation on the surface. On July 1st, the second water replenishment operation was carried out, and the flooding depth in the plot was maintained at 5 centimeters. The artificial water replenishment operation was stopped on November 10th to provide suitable feeding habitat for *Leucogeranus leucogeranus* and avoid the noise of the water pump interfering with the resting feeding activities of the *Leucogeranus leucogeranus* population.

By using the method according to the present disclosure for rapid reconstruction the food source habitat of *Leucogeranus leucogeranus*, by the end of the growing season in 2023, the survival rate of water chestnut bulbs reached 100%, the number of water chestnut bulbs developed per unit area reached 250, and the volume of a single water chestnut was as high as 29.8 cubic centimeters ($cm^3$), and the reconstruction of the food source habitat attracted *Leucogeranus leucogeranus* to engage in feeding activities in the same year. The results showed that this method significantly improved the restoration rate of the food source habitat of *Leucogeranus leucogeranus*, and greatly improved the success probability of the reconstruction of the food source habitat of *Leucogeranus leucogeranus*.

What is claimed is:

1. A method for rapid reconstruction of a food source habitat of *Leucogeranus leucogeranus* by using a returned farmland, comprising following steps:

S1, selecting degraded farmland plots: selecting plots for returning farmland to wetland adjacent to a natural wetland as a target reconstruction site, and dividing stress degrees according to soil saline-alkali states of the plots for returning farmland to wetland;

S2, constructing a connected plot network: dividing independent reconstruction plot units in the reconstruction site, and piling soil ridges around the independent reconstruction plot units and on peripheral edges of the reconstruction site;

S3, improving local soil habitat elements: using surrounding natural wetland water bodies for flood irrigation of the target reconstruction site; using a rotary tiller for rotary tillage of surface soil, and performing secondary rotary tillage after adding vermiculite;

S4, coating water chestnut bulbs: collecting the water chestnut bulbs in the natural wetland at a designated time one year before implementing the food source habitat of *Leucogeranus leucogeranus*, and sequentially performing drying, low-temperature sand storage and a coating operation on the water chestnut bulbs;

S5, cultivating the water chestnut bulbs: cultivating the water chestnut bulbs in a form of rows in a unit reconstruction plot; and S6, regulating and controlling and managing a hydrological environment: using a water pump to divert water to regulate and control the hydrological environment of a selected reconstruction site;

the dividing the stress degrees according to the soil saline-alkali states of the plots for returning farmland to wetland wherein: when a soil saline-alkali state is 0 mmol/L, dividing into no saline-alkali stress, when a soil saline-alkali state is 0-25 mmol/L, dividing into mild saline-alkali stress, when a soil saline-alkali state is 25-50 mmol/L, dividing into moderate saline-alkali stress, and when a soil saline-alkali state is 50-100 mmol/L, dividing into severe saline-alkali stress;

the flood irrigation of the selected reconstruction site wherein: performing flood irrigation until a surface accumulated water depth of the reconstruction site reaches 5-10 centimeters, with a water body retention duration lasting for 2-3 days, and then using the water pump to pump a water body and return to the natural wetland, requiring flood irrigation once for plots without saline-alkali type stress, flood irrigation twice for plots with mild saline-alkali stress, flood irrigation three times for plots with moderate saline-alkali stress and flood irrigation three to four times for plots with severe saline-alkali stress;

in the coating operation, first placing the water chestnut bulbs after the low-temperature sand storage in 1% potassium permanganate solution for disinfection after washing, and then placing in a coating machine and coating in a roller form, wherein the coating machine is required to be internally provided with mixed powder of ammonium nitrate, urea, difenoconazole and brassinolide, and a mass ratio of the ammonium nitrate, the urea, the difenoconazole and the brassinolide is 1.5:7:1:0.5; and when using the water pump to divert the water to regulate and control the hydrological environment of the selected reconstruction site, requiring a first water replenishment work to be carried out within 7 to 10 days after water chestnut seedlings are cultivated, and replenishing water until a soil water content is more than 65% and there is no accumulated water on a surface; requiring a subsequent water diversion work to be carried out when the water chestnut seedlings grow to 3 to 5 centimeters; requiring a flooding depth to be maintained at 5 centimeters after water replenishment; and requiring artificial water replenishment to be terminated in early November.

2. The method for the rapid reconstruction of the food source habitat of *Leucogeranus leucogeranus* by using the returned farmland according to claim 1, wherein the soil ridges are piled by using the surface soil in reconstruction plots around the independent reconstruction plot units, a piling height of the soil ridges is 10-20 centimeters, and a piling width is 20-30 centimeters, and a middle part of each of the soil ridges is reserved with an open gap of 40-50 centimeters; when the soil ridges are piled on the peripheral edges of the reconstruction site, fully enclosed soil ridges are piled, with a piling height of the soil ridges of 30 to 40 centimeters and a piling width of 50 to 60 centimeters.

3. The method for the rapid reconstruction of the food source habitat of *Leucogeranus leucogeranus* by using the returned farmland according to claim 1, wherein when using the rotary tiller for the rotary tillage of the surface soil, a rotary tillage depth of the rotary tiller is 10 to 15 centimeters.

4. The method for the rapid reconstruction of the food source habitat of *Leucogeranus leucogeranus* by using the returned farmland according to claim 1, wherein before performing the secondary rotary tillage after adding the vermiculite, the vermiculite is placed in a 160° C. environment for heating for 2 to 3 hours.

5. The method for the rapid reconstruction of the food source habitat of *Leucogeranus leucogeranus* by using the returned farmland according to claim 1, wherein during the low-temperature sand storage, stored sandy soil materials are disinfected at a high temperature of 160° C. for 2 to 3 hours and cooled to room temperature, then added with distilled water until a sandy soil water content reaches 10-15%, and then uniformly mixed with the water chestnut bulbs and placed in a dark environment at 4° C. for continuous refrigeration, and sandy soil moisture is required to be replenished in the dark environment every 14 days during a refrigeration period.

6. The method for the rapid reconstruction of the food source habitat of *Leucogeranus leucogeranus* by using the returned farmland according to claim 1, wherein when cultivating the water chestnut bulbs in the form of rows in the unit reconstruction plot, the water chestnut bulbs are required to be vertically inserted into a soil layer for 2-4 centimeters with top ends facing upwards by a hole sowing method, and top end parts are covered with in-situ soil; cultivation rows are required to be set parallel to a height direction of midday sun in a reconstruction area; 2 to 3 water chestnut bulbs are required to be cultivated in a single hole, with a preset hole spacing of 30 to 40 centimeters and a preset row spacing of 54.74-136.85 centimeters; and during a cultivation period, no accumulated water on the surface of the unit reconstruction plot and maintaining the soil water content at 80-100% are required.

* * * * *